April 28, 1970     B. HERRMANN     3,508,607
HEAT EXCHANGER
Filed April 16, 1968                            2 Sheets-Sheet 1
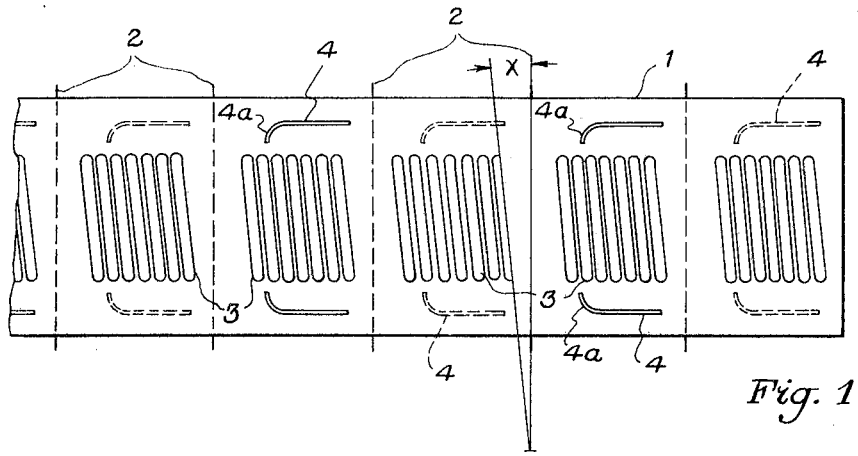
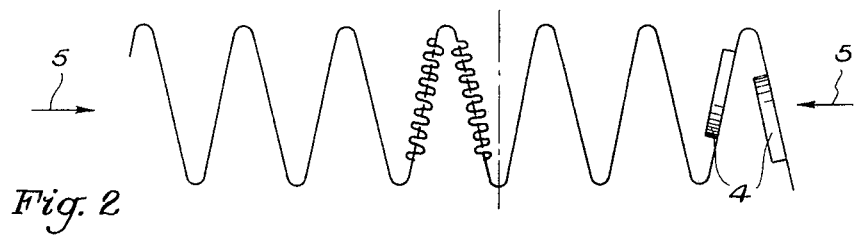
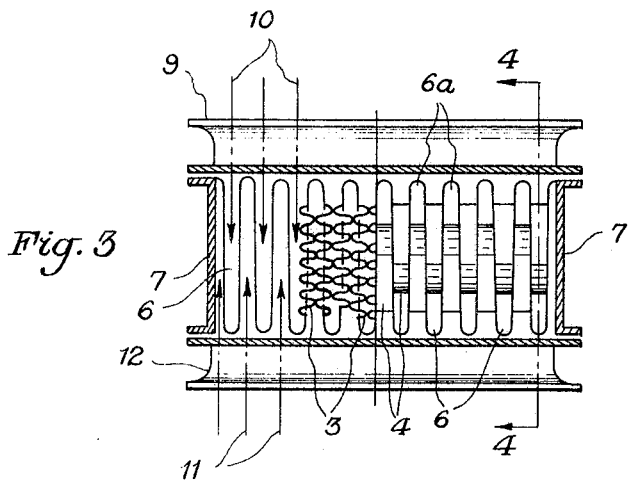
INVENTOR
Bruno Herrmann
BY Stephens, Huettig and O'Connell
ATTORNEYS April 28, 1970  B. HERRMANN  3,508,607
HEAT EXCHANGER
Filed April 16, 1968  2 Sheets-Sheet 2

INVENTOR
Bruno Herrmann

BY Stephens, Huettig and O'Connell
ATTORNEYS

United States Patent Office 3,508,607
Patented Apr. 28, 1970

3,508,607
HEAT EXCHANGER
Bruno Herrmann, Bridgeport, Conn., assignor to Motoren-
und Turbinen-Union, Munich, Germany
Filed Apr. 16, 1968, Ser. No. 721,850
Claims priority, application Germany, Apr. 19, 1967,
M 73,646
Int. Cl. F28d 9/00
U.S. Cl. 165—157      4 Claims

ABSTRACT OF THE DISCLOSURE

The core of a heat exchanger is formed from an accordion folded single metal strip with ducts being formed between the walls extending between the fold lines. Corrugations on the walls form spacers, fluid flow guides, and reinforcing.

---

This invention relates to a heat exchanger with a core consisting of plates with corrugation-type indentations arranged, within the core, in a longitudinal and transverse direction at a distance relative to each other, with the spacings between the plates forming separate ducts alternately open to one or the other side of the heat exchanger so that on the one side of the heat exchanger a heated medium can flow in and out again, while transferring its heat to another medium flowing in and out again at the opposite side.

In the known plate-type heat exchangers, the individual plates, between which the different media flow during the heat exchanging process, must be brazed or welded gastight to the heat exchanger casing, at least, at their edges. In order to ensure high rigidity and strength for the structure formed by the individual plates, the indentations in the plates will additionally be welded or brazed together.

The object of this invention is to provide a compact heat exchanger with a maximum effective surface area and a core of simple construction, which can be manufactured at low cost, and to reduce to a minimum the great number of welding and brazing operations necessary between the plates of known heat exchangers.

According to this invention, this problem is solved by forming the core of the heat exchanger and its associated flow ducts as an accordion-type sheet strip, the length of which is determined by the number of flow ducts required and the resulting number of folds.

Thus, in the folded condition of the sheet strip, separate ducts are formed in one operation alternately open to one or the other side of the heat exchanger to ensure the exchange of heat between two media flowing through the exchanger separate from each other.

A further embodiment of this invention comprises corrugation-type indentations in the sheet strip that will be preformed before folding the strip and are located between the folding lines of the sheet strip with uniform spacing and at a constant inclined angle relative to a folding line, where, for the formation of the heat exchanger flow ducts, the sheet strip shall be folded in such a way as to locate the corrugation-type indentations in the sidewalls of the flow ducts crosswise upon each other. Thus, the manufacture of a heat exchanger becomes much simpler and cheaper. The corrugation-type indentations lying crosswise upon each other after folding together ensure strength and rigidity for the individual flow ducts relative to each other and for the whole core assembly of the heat exchanger.

Another embodiment of this invention comprises additional side indentations arranged continuously in the same manner between the folding lines on either side of the strip, adjacent to the ends of the corrugation-type indentations, which are preformed before folding the strip and project from the top and bottom surface of the sheet strip, and after folding of the strip, provide a guide means for the supply or return of a heat exchanging medium between the walls of the flow ducts and furthermore provide additional rigidity between the flow ducts. These additional side indentations, furthermore, increase the strength and rigidity of the heat exchanger core and, due to their special shape, they improve the flow conditions of the media entering or leaving the exchanger, thus resulting in an improvement of the heat exchanger efficiency.

Thus, in a heat exchanger according to this invention, all indentations necessary for the heat exchanging process and for a strong and rigid construction of the heat exchanger core are provided in one operation before folding the strip together to form the flow ducts. In this case, a prerequisite is that the number of the required flow ducts and their sections are determined before the manufacture of the heat exchanger, so that it will be possible to determine the distances between the sheet strip folding lines, the resulting pitch of the corrugation-type indentations between two folding lines, and the exact location of the spacers between the ducts providing additional rigidity and serving for the supply and return of the media.

According to this invention, the side portions of the sheet strip are left smooth to assist in the supply and return of the media flowing through the ducts when the strip is in the folded condition.

Furthermore, this invention provides that the height of the additional side indentations is equivalent to the spacing of two layers of the sheet metal strip or to the spacing of two walls of a flow duct. This feature together with the smooth sides of the strips ensures that, after folding together the sheet strip, in each case, one duct side wall rests upon two additional indentations or spacers, which, at the same time, ensures that the heat exchanger core is firmly held together.

Another embodiment of this invention provides, in a similar known manner, a greater flow cross-sectional area for the ducts of one fluid medium than for the ducts of the other fluid medium so that, for example, only the corrugation-type indentations of every second flow duct contact each other, which requires the adjustment of the heights of the additional side indentations serving for the supply and return of the media to suit the continuous alternately varying widths of the duct.

The means by which the objects of this invention are obtained are describe dmore fully with reference to the accompanying drawings, in which:

FIGURE 1 is a plan view of a preformed unfolded core strip;

FIGURE 2 is a schematic side view of the strip of FIGURE 1 partially folded;

FIGURE 3 is a cross-sectional view through the heat exchanger;

Figure 4:
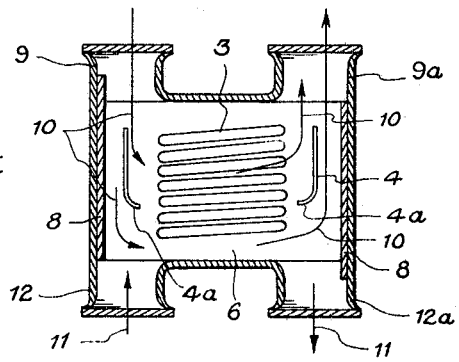
FIGURE 4 is a cross-sectional view taken on the line 4—4 in FIGURE 3.

As shown in FIGURE 1, the core for the heat exchanger starts with a continuous sheet strip 1 having fold lines 2. The distance between two adjacent fold lines 2 corresponds approximately to the height of a side wall of a flow duct when the strip 1 is completely folded, note FIGURE 3. Between two fold lines 2 are preformed parallel and uniformly spaced corrugation-type indentations 3. These indentations 3 terminate short of the side edges of strip 1. Adidtional side indentations 4 are preformed in the space between the indentations 3 and the side edges of strip 1. Side indentations 4 project outwardly in opposite directions in adjacent walls between the fold lines 2, and extend parallel to the side edges of strip 1. One end portion 4a of each side indentation before a fold line is turned inwardly toward the indentions 3.

As shown in FIGURE 2, the strip 1 is in the step of being folded in an accordion-type manner in the direction of the arrows 5 for forming the heat exchanger core.

By arranging the corrugation-type indentations 3, in each case, progressively at the same angle $x$, FIGURE 1, relative to a folding line 2, they lie crosswise on top of one another when the strip is folded and ensure a strong and rigid construction of the heat exchanger core.

The additional indentations 4 project from the upper and lower surface of the sheet strip to a height which is equivalent to the spacing of two layers of sheet strip or to the width of one heat exchanger duct.

FIGURE 3 shows the folded sheet strip 1 forming the core of a heat exchanger. As seen from the left half in FIGURE 3, the corrugation-type indentions 3 contact each other; from the right half of the heat exchanger core, the arrangement of the additional indentations 4 is seen, which, in each case, are located between two walls of a flow duct 6, 6a and which further increase the stability of the heat exchanger core.

Within the heat exchanger casing, the sheet strip is welded or brazed to its side walls 7, FIGURE 3, and 8, FIGURE 4, only.

The individual ducts 6, 6a, separate from each other, are alternately closed to one side of the heat exchanger and open to the other. Through connection 9, FIGURES 3 and 4, a heated medium flows in the direction of the arrows 10, from one side into the ducts 6, and it is then guided by the additional indentations 4, turned at the ends 4a, through the ducts 6 and their corrugation-type indentations 3 and leaves the heat exchanger through another casing connection 9a. Similarly, a cool medium taking up the heat enters from the other side of the heat exchanger through connection 12, as shown by the arrows 11, and flows through the open ducts 6a, where it is guided through the ducts and their corrugation-type indentations 3 by means of the additional side indentations 4, and finally leaves the heater through connection 12, FIGURE 4.

Figure 5:
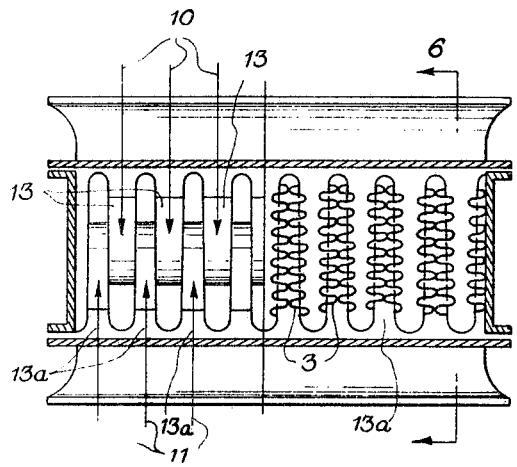
FIGURE 5 is a view similar to FIGURE 3 of a modified form of this invention.
Figure 6:
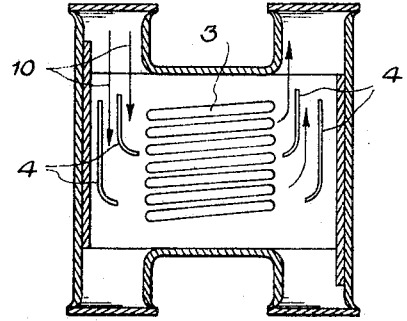
FIGURE 6 is a cross-sectional view taken on the line 6—6 in FIGURE 5.

FIGURE 5 shows the folded sheet stip of a heat exchanger, whose ducts 13 for the heated medium have a greater cross-sectional area than the ducts 13a carrying the cool medium which takes up heat. In this embodiment, only the corrugation-type indentations 3 in the ducts 13a lie on top of one another, with the strip 1 in the folded condition. In order to ensure sufficient rigidity for the heat exchanger core, this embodiment provides two additional indentations 4 each between two side walls of a duct 13, FIGURE 6, which will improve flow conditions and serve as spacers. The flow path through the heat exchanger in FIGURES 5 and 6 with media 10 and 11 is the same as in FIGURES 3 and 4.

Figure 7:
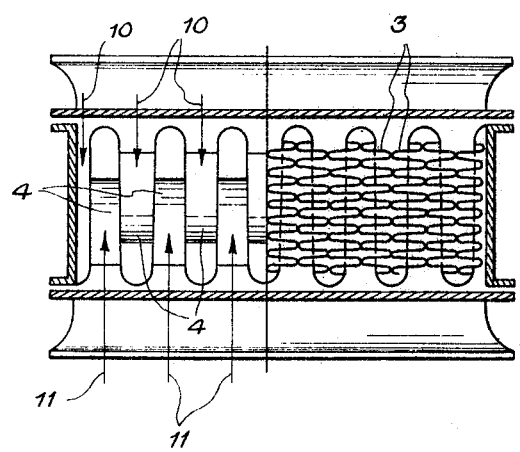
FIGURE 7 is a cross-sectional view through a further modification of this invention.

The only difference between the heat exchanger shown in FIGURE 7 and the embodiments already shown and described is the greater duct cross-sectional area for the media 10, 11 flowing separately into the heat exchanger. Before folding together the sheet strip 1, deeper indentations 3 and 4 are provided, accordingly increasing the size of the ducts.

Having now described the means by which the objects of this invention are obtained,

I claim:

1. In a heat exchanger comprising a casing, a core within said casing and secured thereto, said core being composed of an accordion-type folded strip forming ducts alternately opened on one side and the other side of the casing, fluid inlet and outlet means in said casing for introducing heating medium on one side of said casing and through alternate ducts and cooling medium on the other side of said casing and through the other ducts for transferring heat, the improvement in which said strip has smooth side portions and uniformly spaced corrugation-type indentation (3) preformed in said strip in rows between the folding lines and said side portions and extending at an angle thereto with the indentations on adjacent walls crossing each other.

2. In a heat exchanger as in claim 1, said indentations terminating short of the side edges of said strip, and additional side indentations (4) between said indentations (3) and the side edges of said strip and extending substantially parallel to said side edges, said side indentations forming corrugations projecting outwardly in opposite directions in adjacent walls, guide means for the supply and return of the heated and the cool medium and for increasing the rigidity of said core.

3. In a heat exchanger as in claim 2, said side indentations (4) each having a height equal to the distance between the walls of a duct.

4. In a heat exchanger as in claim 3, said ducts being divided into two sets with one set having wider ducts than the other set, and with the indentations (3) on the walls of the alternate ducts of said other ducts bearing on each other.

References Cited

UNITED STATES PATENTS

| 2,064,931 | 12/1936 | Lysholm | 165—166 |
| 2,090,222 | 8/1937 | Merveu | 165—152 |
| 2,953,110 | 9/1960 | Etheridge | 29—157.3 |
| 3,258,832 | 5/1966 | Gerstung | 113—118 |
| 3,341,925 | 9/1967 | Gerstung | 29—157.3 |

LLOYD L. KING, Primary Examiner

T. W. STREULE, Jr., Assistant Examiner

U.S. Cl. X.R.

165—166